US012794133B2

(12) United States Patent
Obermayer et al.

(10) Patent No.: US 12,794,133 B2
(45) **Date of Patent: *Nov. 10, 2026**

(54) ANTENNA AND CELL SITE

(71) Applicant: Telefonaktiebolaget LM Ericsson (publ), Stockholm (SE)

(72) Inventors: Maximilian Obermayer, Wörgl (AT); Andreas Vollmer, Rosenheim (DE); Markus Mohr, Rosenheim (DE); Anian Kaffl, Brannenburg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

This patent is subject to a terminal disclaimer.

(21) Appl. No.: 18/715,798

(22) PCT Filed: Dec. 22, 2021

(86) PCT No.: PCT/EP2021/087435

§ 371 (c)(1), (2) Date: Jun. 3, 2024

(87) PCT Pub. No.: WO2023/117097

PCT Pub. Date: Jun. 29, 2023

(65) Prior Publication Data

US 2025/0015504 A1 Jan. 9, 2025

(51) Int. Cl.

*H01Q 9/28* (2006.01)
*H01Q 1/24* (2006.01)
*H01Q 25/00* (2006.01)

(52) U.S. Cl.

CPC ............... *H01Q 9/28* (2013.01); *H01Q 1/246* (2013.01); *H01Q 25/001* (2013.01)

(58) Field of Classification Search

CPC ......... H01Q 9/28; H01Q 1/246; H01Q 25/001

See application file for complete search history.

(56) References Cited

U.S. PATENT DOCUMENTS 4,287,518 A 9/1981 Ellis, Jr.
4,686,536 A * 8/1987 Allcock ................. H01Q 9/065 343/797

(Continued)

FOREIGN PATENT DOCUMENTS

CN 113889747 A 1/2022
CN 114122718 A 3/2022

(Continued)

OTHER PUBLICATIONS

Marnat, et al., "On-Chip Implantable Antennas for Wireless Power and Data Transfer in a Glaucoma-Monitoring SoC," IEEE Antennas and Wireless Propagation Letters, vol. 11, Jan. 2012, pp. 1671-1674.

(Continued)

*Primary Examiner* — Hai V Tran

(74) *Attorney, Agent, or Firm* — Withrow & Terranova, PLLC

(57) ABSTRACT

An antenna, in particular for a mobile communication cell site, comprises at least one radiator and a radiator feed being electrically coupled to the at least one radiator, the radiator being a dual polarized dipole radiator, wherein each dipole is formed of two dipole arms and the dipoles are in a crossed arrangement relative to each other, wherein the radiator feed comprises a respective feed line for each polarized dipole and extends within a single feed plane between the dipole arms intersecting the dipoles in the region of the crossing. Further, a cell site comprising such antenna is shown.

21 Claims, 8 Drawing Sheets

(56) References Cited

U.S. PATENT DOCUMENTS

| | | | | |
|---|---|---|---|---|
| 6,400,332 | B1 * | 6/2002 | Tsai | H01Q 9/285 343/700 MS |
| 7,053,852 | B2 | 5/2006 | Timofeev et al. | |
| 7,978,144 | B2 | 7/2011 | Tanabe et al. | |
| 9,306,262 | B2 | 4/2016 | Puzella et al. | |
| 9,437,929 | B2 | 9/2016 | Isom et al. | |
| 11,158,956 | B2 | 10/2021 | Le | |
| 2003/0090430 | A1 | 5/2003 | Waltho | |
| 2011/0122039 | A1 | 5/2011 | Baba et al. | |
| 2012/0075155 | A1 * | 3/2012 | Lindmark | H01Q 19/106 343/834 |
| 2012/0098725 | A1 * | 4/2012 | Lytle | H01Q 21/26 343/797 |
| 2014/0111396 | A1 | 4/2014 | Hyjazie et al. | |
| 2014/0240056 | A1 | 8/2014 | Isom et al. | |
| 2016/0372839 | A1 | 12/2016 | Watson et al. | |
| 2018/0034165 | A1 | 2/2018 | Aleksandrovich et al. | |
| 2019/0280377 | A1 * | 9/2019 | Zhang | H01Q 1/523 |
| 2020/0006861 | A1 | 1/2020 | Kasani et al. | |
| 2021/0207683 | A1 * | 7/2021 | Bell | H02G 1/08 |
| 2021/0305718 | A1 * | 9/2021 | Li | H01Q 5/48 |
| 2021/0305722 | A1 * | 9/2021 | Zhang | H01Q 21/26 |
| 2021/0376481 | A1 | 12/2021 | Zhang et al. | |
| 2022/0077600 | A1 | 3/2022 | Sundararajan et al. | |
| 2023/0017375 | A1 * | 1/2023 | Wu | H01Q 5/42 |

FOREIGN PATENT DOCUMENTS

| | | | |
|---|---|---|---|
| CN | 216055166 | U | 3/2022 |
| EP | 1772929 | A1 | 4/2007 |
| EP | 2672568 | A2 | 12/2013 |
| WO | 2018224666 | A1 | 12/2018 |
| WO | 2022022804 | A1 | 2/2022 |
| WO | 2023117096 | A1 | 6/2023 |

OTHER PUBLICATIONS

Yuan, et al., “Novel Miniaturized Broadband Quasi-Yagi Antennas Based on Modified Bowties Driver for Wireless Technology Applications,” Progress in Electromagnetics Research M, vol. 63, Jan. 2018, pp. 151-161.

International Search Report and Written Opinion for International Patent Application No. PCT/EP2021/087434, mailed Jul. 28, 2022, 11 pages.

Li, Ronglin, et al., “Equivalent-Circuit Analysis of a Broadband Printed Dipole With Adjusted Integrated Balun and an Array for Base Station Applications,” IEEE Transactions on Antennas and Propagation, vol. 57, Issue 7, Jul. 2009, pp. 2180-2184.

International Search Report and Written Opinion for International Patent Application No. PCT/EP2021/087435, mailed Jul. 28, 2022, 10 pages.

* cited by examiner

ANTENNA AND CELL SITE

This application is a 35 U.S.C. § 371 national phase filing of International Application No. PCT/EP2021/087435, filed Dec. 22, 2021, the disclosure of which is incorporated herein by reference in its entirety.

TECHNICAL FIELD

The invention relates to the field of antennas, in particular having dual polarized dipole radiators, comprising a feeding structure as well as a corresponding cell site having an antenna.

BACKGROUND

Antennas are typically composed of multiple radiators so as to enable radio frequency cellular communication with an improved transmission range and/or with distinct frequency bands. Such radiators may be formed as dual polarized dipole radiators, which are formed of two dipole arms, each dipole arm requiring a respective feed structure.

These feed structures may be realized on a PCB. In order to provide a respective feed line for both dipoles for the different polarizations, the feed structure is commonly formed of two PCB parts that are positioned such that the respective feed lines are in an orthogonal arrangement to each other. Examples of such feed structures are described, e.g., in U.S. Pat. Nos. 6,072,439, 7,053,852, EP 2 672 568 A2, EP 1 772 929 A1, and WO 2018/224666 A1.

SUMMARY

The feed structure forms a costly component of the antenna and the correct placement increases the manufacturing effort and furthermore limits the integration of radiator components in the antenna.

It is thus the object of the invention to provide a feed structure that abrogates the above undesirable problems, in particular to provide a feed structure that facilitates manufacturing of the antenna and lowers the corresponding manufacturing costs while preferably enabling an improved architecture flexibility of the antenna.

Said object is achieved by the independent claims. Preferred embodiments are depicted in the dependent claims, the description, and the Figures.

Accordingly, in a first aspect, an antenna is suggested, in particular for a mobile communication cell site, comprising at least one radiator and a radiator feed being electrically coupled to the at least one radiator, the radiator being a dual polarized dipole radiator, wherein each dipole is formed of two dipole arms and the dipoles are in a crossed arrangement relative to each other, wherein the radiator feed comprises a respective feed line for each polarized dipole and extends within a single feed plane between the dipole arms intersecting the dipoles in the region of the crossing.

By providing the radiator feed in a single plane, the footprint of the radiator feed is significantly reduced, such that the integration of other radiator components may be facilitated. This may be particularly advantageous in multi-band architectures, wherein different radiators may be present in an array and which may require respective feed structures.

Furthermore, the arrangement within a single plane facilitates manufacturing, since the placement of the radiator feed may be performed essentially within a single step and the radiator feed structure does not need to be adapted to a crossed or orthogonal arrangement.

The arrangement in a single feed plane enables that the radiator feed may be provided as two parts having a respective feed line that are arranged in parallel to each other, i.e. are spaced apart, yet within said single feed plane, which extends through the region of the crossing of the dipole arms.

In particular, in a preferred embodiment, the radiator feed may be formed as a single piece. In such case, the radiator feed extends through said region of the crossing, essentially forming a linearly extending radiator feed. Such configuration further facilitates the manufacturing, since this only requires a single part to be mounted to provide the radiator feed for the respective radiator. Accordingly, this may further reduce the manufacturing costs and effort due to the reduced number of parts and the reduced number of steps during manufacturing.

Preferably, adjacent dipole arms are spaced apart by a gap, wherein the gap defines the single plane. For example, all of the dipole arms may be spaced apart from each other, essentially defining two linearly extending gaps that intersect each other, e.g. at the region of the crossing of the dipole arms. One of these gaps may then be used for the placement of the radiator feed.

The dipole arms of the radiator may define a centroid of the radiator and the radiator feed and/or feed plane may extend through said centroid. Alternately, or in addition, gaps between adjacent dipole arms may define a center region of the radiator interconnecting said gaps and the radiator feed and/or feed plane may extend through said center region.

In accordance, the dipole arms of the radiator may furthermore define at least one line of symmetry through the region of the crossing. Thereby, the radiator feed and/or feed plane may extend along the line of symmetry or in a direction being essentially perpendicular to a line of symmetry, e.g. when the radiator is not rotationally symmetric.

To facilitate the placement of the dipole arms and the radiator feed, the dipole arms of each dipole preferably extend in a dipole plane, in particular the dipole arms of both dipoles extend in the same dipole plane, wherein the radiator feed extends perpendicular to said dipole plane. Such arrangement may furthermore facilitate the appliance of galvanic electrical couplings between a respective dipole and the radiator feed.

In addition, this may also facilitate the placement of the radiator feed on a reflector, optionally resulting in an arrangement, wherein the radiator feed is perpendicular to a plane of the reflector and the plane of the dipoles.

Preferably, the radiator and/or the radiator feed comprise a substrate and conductors applied to the substrate, wherein the conductors form the dipole arms or the feed lines, respectively, particularly wherein the substrate is a single layered PCB or a multi-layered PCB. The conductors may be formed as traces or as metallization, e.g. in the form of a microstrip line. The use of PCB structures further improves the versatility and flexibility of the antenna architecture and ensures an optimal use of the available circuitry space. The PCB may be a flexible PCB.

Moreover, the use of such substrate enables that the radiator feed may form a support structure for the radiator. In other words, a mechanical support may be provided by means of the radiator feed for the radiator, e.g. a substrate of the radiator with integrated metallization forming the dipole arms may be held in place by the support structure formed by the radiator feed.

The substrate also facilitates that the radiator feed may be formed as a single piece. In particular, the radiator feed may be formed of a (multi-layered) PCB and extend through the region of the crossing so as to provide a respective feed line for both of the dipole arms.

The dipoles of the radiator are formed as linear polarized dipoles or cross dipole, e.g. a wideband cross dipole. The feed plane of each radiator is preferably 45° or −45° rotated relative to the radiator polarization and/or wherein the radiator is preferably 45° or −45° polarized.

The radiator may also be orthogonal polarized, for example X-polarized or VH-polarized, wherein the feed plane of each radiator is ±45° or ±135° rotated in respect to the polarization plane. In other words, the feed plane may be 45° rotated in respect to the first linear polarization plane and 135° rotated in respect to the second linear polarization plane.

Each feed line may comprise at least one ground line and a signal line. The electric field of the feed lines are preferably in the same plane.

Preferably, the ground line and the signal line are forming a microstrip line together. For this feed line type, the ground line may particularly be understood as ground plane. The provision as a microstrip line has the advantage that the signal may be transmitted with little losses.

The electric coupling between the ground line and the respective dipole arm and/or between the signal line and the respective dipole arm may be a galvanic connection or capacitive coupling. The dipole arm is thereby to be understood as the electrically conducting element forming the respective dipole, which may be present in the form of a metallization on a substrate.

Preferably, each feed line comprises two ground lines that are arranged adjacent to and at opposing sides of the signal line. In other words, the signal line may be arranged at a middle position and may be flanked by a respective ground line. The ground lines, however, are preferably not within the same plane as the signal line, but are spaced apart and may be separated by a substrate such as a PCB. Accordingly, the ground lines and signal line may be arranged at opposing surfaces of the substrate, most preferably in the form of a microstrip line. The use of two ground lines has the advantage that the performance stability of the antenna may be further improved, which may be particularly beneficial for particular frequency ranges and/or a particular type of metallization.

In a preferred embodiment, one of the ground lines of a respective feed line is galvanically connected to the respective dipole arm and the other one of the ground lines of the respective feed line is capacitively coupled to said dipole arm. Thereby, the number of galvanic connections may be effectively reduced, further facilitating the manufacturing.

Depending on the antenna or radiator requirements, a direct galvanic coupling may, however, be preferable. According to another embodiment, both ground lines of a respective feed line may hence be galvanically connected to the respective dipole arm, wherein said ground lines are preferably electrically connected to each other via a transmission line arranged on the radiator, e.g. via corresponding ground pins galvanically connected to said transmission line. Such direct connection of the grounding may be particularly advantageous when using lower frequency bands, e.g., in the range of 1.7 GHZ to 2.7 GHZ.

One of the dipole arms of one of the polarized dipoles of the radiator is preferably electrically connected to the signal line of the respective feed line, wherein the signal line and the at least one ground line are preferably coupled to a different one of the dipole arms. In other words, each polarized dipole is formed of two dipole arms, wherein one of said dipole arms may be electrically connected to a respective signal line and the other one of said dipole arms may be electrically connected to the respective ground line(s) of the same feed line.

In order to facilitate the electric connection between the signal line and the respective dipole arm, the radiator may comprise an electrically conducting connecting arm electrically connected to a respective one of the dipole arms and bridging the region of the crossing. The connecting arm is preferably electrically connected to the signal line.

An electrical connection is understood as a connection through electromagnetic coupling or through a galvanic connection, wherein electromagnetic coupling is understood as capacitive coupling and/or inductive coupling. The connecting arm is preferably directly electrically connected to the signal line, e.g. via a galvanic connection.

The connecting arms for both of the polarized dipoles of the radiator may particularly bridge the centroid of the radiator and/or the center region of the radiator defined by gaps between adjacent dipole arms and interconnecting said gaps, wherein the connecting arms may hence overlap or cross each other.

The provision of the connecting arms facilitates that the respective feed lines may be arranged within the single feed plane and an electrically conductive connection may be provided without significantly modifying the structure of the feed line and dipole arms. Furthermore, this may provide a level of symmetry, such that the respective dipole arms are equally affected by the arrangement of the connecting arms. The electric coupling between the respective connecting arm and the respective signal line is preferably galvanic and may furthermore support that both the coupled dipole arm and typically an optional substrate of the dipole arm are mechanically held in place and maintain attached to the signal line and radiator feed as a whole.

The radiator feed may extend through the substrate of the radiator from a bottom surface of the substrate to a top surface of the substrate.

The connecting arms of the radiator may be arranged along the top surface of the substrate, the bottom surface of the substrate or along opposing surfaces of the substrate.

Alternatively, or in addition, each dipole arm may be formed as a metallization on the substrate, wherein the metallization of each polarized dipole extends in a single plane and wherein the metallization of the polarized dipoles of the radiator are arranged along the top surface of the substrate or the bottom surface of the substrate.

The provision of the connecting arms e.g. at least partially at the same surface has the advantage that a potentially required galvanic coupling with the signal line may be facilitated, since such coupling may be performed at one side of the surface. This is further facilitated, when the connecting arms are arranged at a top surface, since the accessibility may be accordingly improved in the mounted state of the radiator and the radiator feed.

The arrangement of the connecting arms at least partially at the bottom surface, however, may be advantageous, when the metallization forming the dipole arms is arranged at the top surface.

By the same token, the arrangement of the connecting arms at opposing sides provides an improved level of architecture flexibility and adaptation to the geometry and/or polarization of the radiator or other components of the antenna. For example, the connecting arms may be arranged at least in part at opposing surfaces, when the metallization forming the dipole arms is arranged at one side or surface of the substrate.

In accordance, the at least one polarized dipole and the connecting arm of the respective polarized dipole may be arranged at opposing surfaces of the substrate. Thereby, it may be avoided that the connecting arms intersect each other, e.g. when the metallization forming the dipole arms is arranged at only one side or surface of the substrate.

The connecting arm may be galvanically connected to the signal line and capacitively coupled to the metallization of the respective dipole arm. This provides the advantage that the connecting arms may be arranged at opposing sides of the substrate, e.g. to avoid an intersection of the connecting arms. In such case, the metallization forming the respective dipole arm may be arranged at an opposing side or surface of the substrate and yet be electrically coupled to the signal line via the capacitive coupling, i.e. through the substrate.

Such configuration hence reduces the requirement of galvanic couplings, thereby reducing the manufacturing costs, since the use of metallized through holes through the substrate, e.g., vias, may be avoided or at least reduced. Alternatively, such metallized through holes may be provided in order to establish an electric coupling between the respective dipole arm and the respective connecting arm.

As an example, one signal line may be galvanically connected to the connecting arm at a bottom surface of the substrate and the connecting arm may extend along said surface towards a respective dipole while bridging the region of the crossing. After bridging said crossing, the connecting arm may either be electrically connected to a metallization of said dipole arm at a top surface of the substrate through capacitive coupling or a galvanic connection, e.g., through a via. By the same token, the other connecting arm may be galvanically connected to the respective signal line at the top surface of the substrate and extend fully along the top surface towards the respective dipole arm and may be galvanically connected to the corresponding metallization of said dipole arm at the top surface of the substrate.

In a preferred embodiment, the antenna may comprise at least two radiators supported by the radiator feed, wherein the radiator feed is formed as a single piece. The at least two radiators may form an antenna array.

In such configuration, the radiator feed may include a signal distribution network portion, preferably extending essentially between adjacent radiators. The signal distribution network portion may provide network circuitry for combining the radiators and/or for providing a radio frequency distribution between the radiators. By including such signal distribution network portion in the radiator feed, manufacturing may be simplified, since both the necessary feed lines and the signal distribution network may be provided for the two radiators in a single step, i.e. by placement of the radio feed. Furthermore, this reduces the risk of connectivity failures, since the signal distribution network is directly formed on the single-piece radiator feed.

In an array, wherein multiple radiators are present, even more than two radiators may be combined in such manner by a corresponding extension of the radiator feed.

The radiator feed according to the embodiment may comprise one or more sidewall portions, which preferably extend at least partially, in particular fully in parallel to the feed plane.

The sidewall portions may comprise a metallization so as to provide one or more respective functionalities or electrically conductive couplings, e.g. for further electronic components of the radiator present on the reflector.

The antenna may furthermore comprise a reflector, wherein the radiator feed is formed and arranged such that the signal distribution network portion extends essentially above or below the reflector. Different functionalities of the signal distribution network may furthermore be arranged at least partially at opposing surfaces of the reflector, such that the signal distribution network may be adapted to a given complexity and/or the requirements of the antenna as a whole.

The radiator feed may also comprise at least one reflector connection for the reflector, which is arranged at a portion of the radiator feed being spaced apart from the feed lines, in particular between adjacent radiators. In other words, the additional at least one reflector connection for the reflector is present within the feed plane, but is electrically isolated from the feed lines. By the same token, the portion of the radiator feed comprising the feed lines is preferably arranged so as to be electrically isolated from the reflector in this portion. In this manner, potential strong interactions between lower frequency radiators and higher frequency radiators may be avoided or may be shifted into another frequency range with defined groundings below the reflector, between the radiator feed and the reflector. For example, the common mode, also called monopole mode, of the radiator may be shifted to lower frequencies in this manner.

According to another aspect of the invention, a cell site comprising an antenna as explained above is suggested. The cell site may comprise an amplifier or transceiver for the one or more radiators.

The features and advantages discussed with respect to the antenna also apply to the cell site and vice versa.

BRIEF DESCRIPTION OF THE DRAWINGS

The present disclosure will be more readily appreciated by reference to the following detailed description when being considered in connection with the accompanying drawings in which.

DETAILED DESCRIPTION

Figure 1:
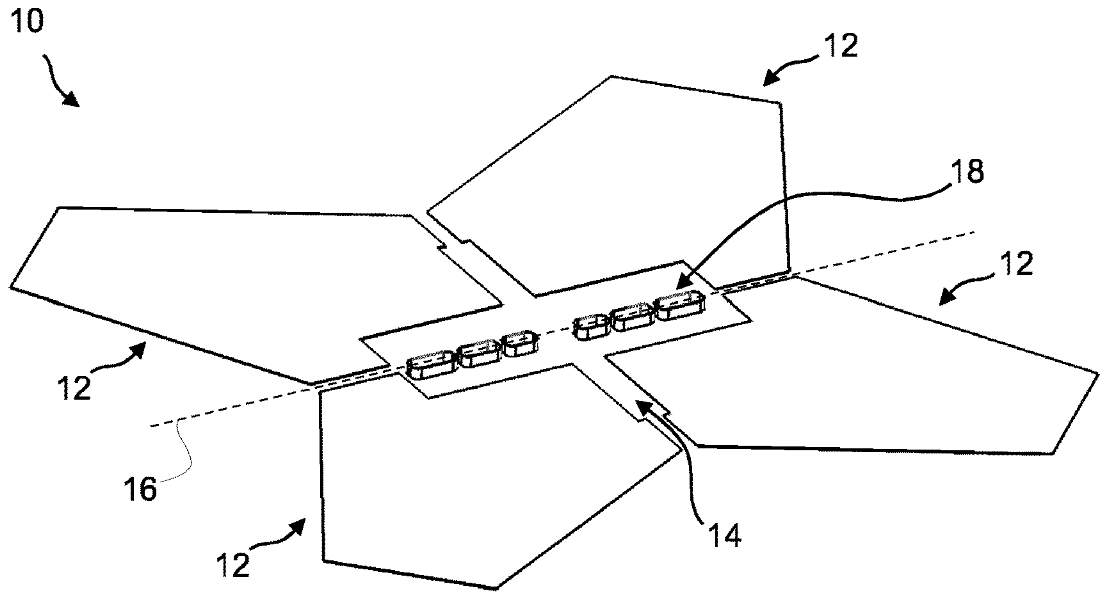
FIG. 1: shows a radiator having four dipole arms in a perspective view without a radiator feed and without a substrate.

In the following, the invention will be explained in more detail with reference to the accompanying Figures. In the Figures, like elements are denoted by identical reference numerals and repeated description thereof may be omitted in order to avoid redundancies.

In FIG. 1 a radiator 10 is schematically shown in a top perspective view. The radiator 10 is formed as a dual polarized dipole radiator for use with a corresponding antenna and is essentially composed of four dipole arms 12, which are arranged and extend within a single dipole plane.

The dipole arms 12 according to this exemplary embodiment are to be understood as a metallization, which is to be electrically connected to a corresponding feed line of a radiator feed (not shown).

Such metallization is preferably present on a PCB, wherein the PCB of the radiator 10 forms a corresponding substrate for the dipole arms 12. Accordingly, the dipole arms 12 may preferably be provided on a single substrate, but may alternatively also be formed on separate portions or PCB parts, depending on the geometry of the radiator, the requirements of the antenna and potential mechanical restraints.

In order to facilitate the electrical connection of the dipole arms 12 to the radiator feed, the radiator 10 comprises corresponding connecting holes 18, which enable an electrical connection from one surface of the substrate to the opposing surface, e.g. between a top and bottom surface. The connecting holes 18 may be formed as a metallized through hole and are formed and dimensioned to receive connecting ends of the radiator feed.

As shown in FIG. 1 with the dashed line, the connecting holes 18 are arranged within a single plane, called feed plane within this disclosure.

The connecting holes 18 are formed as two groups of three connecting holes 18, each group being configured to electrically connect a respective feed line of the radiator feed so as to provide a feed for two dipole arms 12 forming a polarized dipole. According to this example, each feed line may comprise a connecting hole 18 for a respective signal line of the feed line, which is electrically connected to one of the dipole arms 12, and one or two connecting holes 18 (two are shown in the present example) for a respective ground line of the feed line, which is electrically coupled to the other dipole arm 12. This will be explained in further detail below, in particular in view of FIGS. 2 to 8 and 11 to 14.

Between each pair of adjacent dipole arms 12 a gap 14 is present, such that the dipole arms 12 are not in contact with each other. The gaps 14 are interconnected at a centroid or center of gravity of the radiator 10, i.e. of the dipole arms 12.

The gap 14 between the dipole arms forming an orthogonal polarization may also be provided in a manner, wherein the gap 14 is provided at the beginning or at one end portion of the adjacent dipole arms 12 and is closed at the end or opposing end portion of the adjacent dipole arms 12. In particular, the gap 14 may extend from the center outwards but not over the full length of the adjacent dipole arms 12. The dipole arms 12 may thus be connected further outwards.

For example, some radiator metallization forms may have closed the gap 14 between adjacent dipole arms 12 after a gap length smaller than 0.25*λ; 0.2*λ; 1.5*λ; 0.125*λ; or 0.1*λ, where λ is the effective wavelength of the lowest working frequency of the radiator.

In such embodiments, the radiator feed 20 may be formed as separated feed lines, e.g. as separate parts or as a single continuous part having a recessed portion bridging the closed portion of the radiator 10. In any case, the feed lines are still arranged within the same feed plane. Examples of such embodiments are exemplified in FIGS. 9 and 10.

The gaps 14 furthermore define the single plane indicated with the dashed line, along which the connecting holes 18 are arranged. This plane furthermore corresponds to a feed plane of the radiator feed, which is further exemplified in FIGS. 4 and 5. Accordingly, the radiator feed may be arranged along the single plane.

In this manner, orthogonal arrangements of two radiator feeds may be entirely avoided and the mounting of the radiator feed may be significantly facilitated. Furthermore, this allows that the radiator feed may be formed as a single piece. As described above, this further reduces the manufacturing effort and corresponding costs and requires a lower number of parts for the assembly of an antenna.

Figure 2:
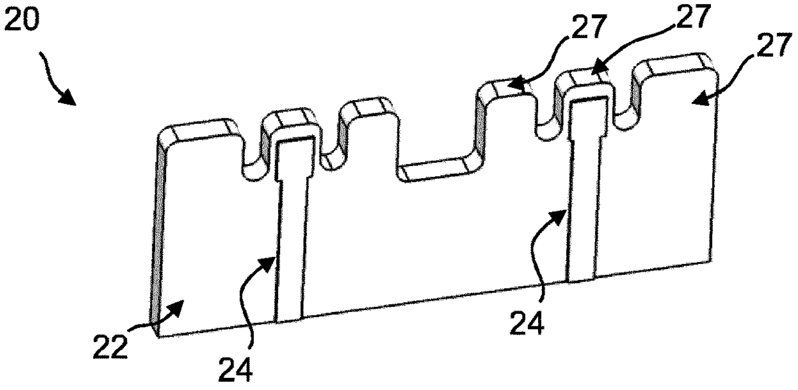
FIG. 2, 3: show a perspective side view of a radiator feed according to the invention from opposing sides.
Figure 3:
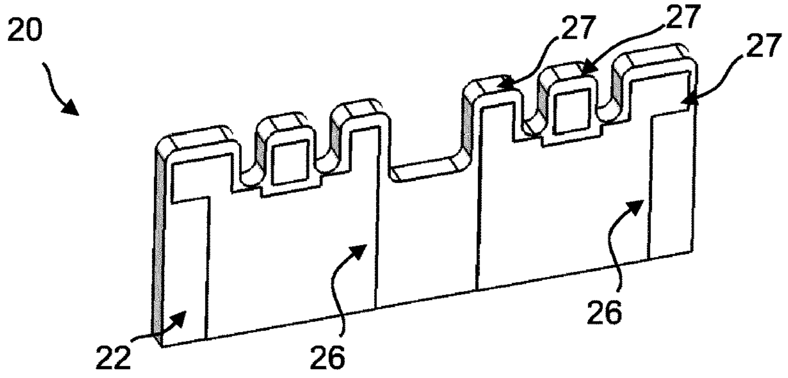

A preferred example of such radiator feed is shown in FIGS. 2 and 3. Accordingly, the radiator feed 20 may also comprise a substrate 22 such as a PCB.

In the present example, a signal line 24 and two ground lines 26 are present for each polarized dipole of the radiator. The ground lines 26 simultaneously form the ground plane for the microstrip signal line 24.

As shown in the opposing side views in FIGS. 2 and 3, the signal line 24 and the ground line 26 are arranged at opposing surfaces of the substrate 22, which corresponds to the preferred microstrip line structure.

Furthermore, at the top end of the substrate 22, the substrate 22 comprises contacting protrusions 27, in the shown embodiment three contacting protrusions 27 for each polarized dipole of the radiator 10, wherein at each one of the contacting protrusions 27, one of the signal lines 24 or the ground lines 26 is provided.

It is to be understood that the ground lines 26 may also be formed as a single line in regions lower than the contacting protrusions 27.

At the top end of the substrate, the ground line 26 is arranged adjacent to the signal line 24, such that the contacting protrusions 27 with the ground lines 26 flank the (central) contacting protrusions 27 with the signal line 24. Thereby, potentially detrimental electrical interferences may be significantly reduced or avoided to a large extent.

The radiator feed 20 comprises two signal lines 24 at respective spaced-apart portions of the substrate 22 and is formed as a single piece. Thereby, the radiator feed 20 defines a single feed plane, which corresponds to the feed plane 18 indicated in FIG. 1. Accordingly, when assembled with a radiator, the radiator feed 20 for both polarized dipoles may extend linearly, thus considerably reducing the footprint of the radiator feed 20.

Figure 4:
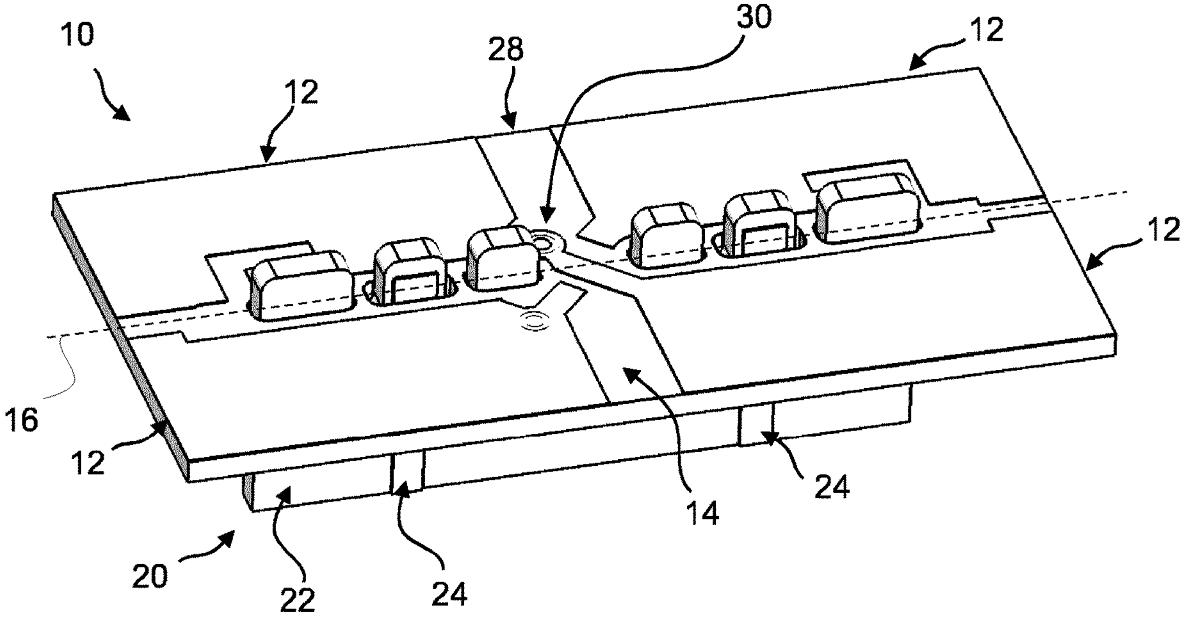
FIG. 4,5: show a perspective top view of the radiator feed according to FIGS. 2 and 3 in a mounted state with parts of the radiator according to FIG. 1.
Figure 5:
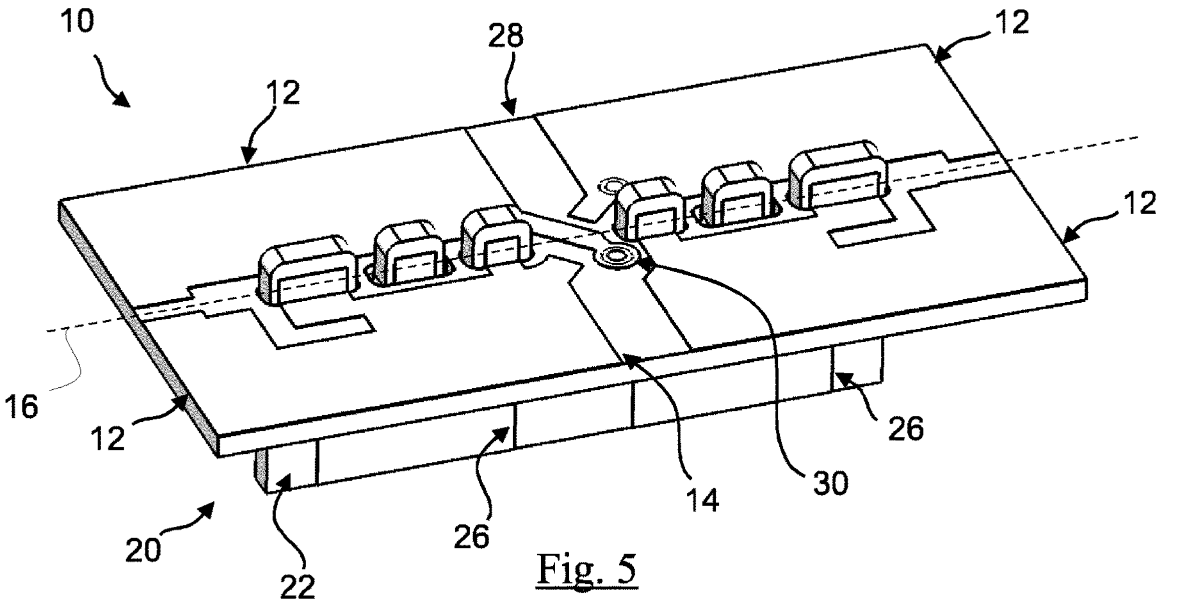

In FIGS. 4 and 5, the radiator feed 20 according to FIGS. 2 and 3 is depicted in an assembled state with a radiator 10, e.g. the radiator 10 of FIG. 1.

Here, the radiator 10 is also shown with a corresponding substrate 28, which is preferably formed of PCB material.

In the assembled state it can be recognized that the radiator feed 20 extends through the substrate 28 of the radiator 10 from the bottom surface to the top surface.

More precisely, the contacting protrusions 27 with the signal lines 24 and ground lines 26 are received by the corresponding connecting holes 18 in the openings of the substrate 28. The minimum distance between two holes corresponding center point is preferably around 3.5 mm.

Furthermore, the metallization of the dipole arms 12 is provided at the top surface of the substrate 28. As will be appreciated from FIG. 5, the metallization of two adjacent dipole arms 12 is electrically connected to the corresponding ground lines 26 of the respective feed lines.

The signal lines 24, however, are connected to a respective metallization of the other two adjacent dipole arms 12 by a corresponding connecting arm (not shown), which extends essentially along the bottom surface of the substrate 28. These connecting arms are electrically connected to the top surface metallization by means of a respective via 30 in the substrate 28, as shown in FIGS. 4 and 5.

The connecting arms are positioned so as to form a crossed arrangement, yet extend at least partially along opposing surfaces, such that an intersection of said connecting arms is avoided. This will be explained in further detail in view of FIGS. 7 and 8 below.

By means of the configuration of the radiator feed 20 and the advantageous electric connection provided by the radiator 10, an effective assembly may hence be provided, wherein only a single radiator feed 20 is required for two polarized dipoles and which reduces the footprint and amount of parts compared with common orthogonal arranged of multi-part radiator feeds. By using the gap 14 between the dipole arms 12 for the radiator feed 20 and the corresponding connecting holes or vias of the substrate 28, a very efficient radiator and antenna architecture is provided, as shown schematically in FIG. 6.

Figure 6:
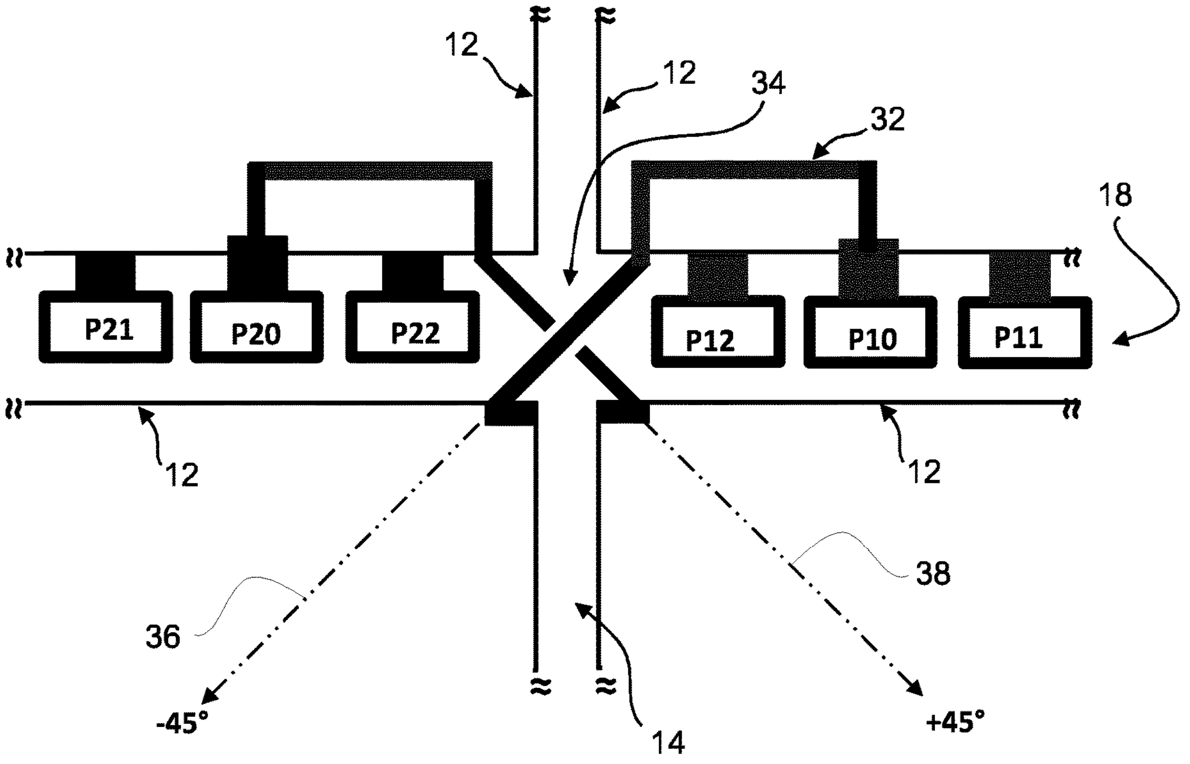
FIG. 6: shows a schematic top view of dual polarized dipole radiator according to the invention with crossing connecting arms for signal lines.

FIG. 6 depicts a schematic top view of a radiator 10. The connecting holes 18 of the radiator 10 are arranged in a similar manner and hence correspond to the arrangements according to FIGS. 1 to 5 for receiving respective signal lines and ground lines for each polarized dipole. In the present example, the connecting holes 18 that are indicated with P10 and P20 are the connecting holes 18 for receiving contacting protrusions 27 with the respective signal line 24. The signal line 24 is electrically coupled to a respective dipole arm 12 by means of a respective connecting arm 32.

The connecting arm 32 is arranged in a crossed arrangement and bridges the gap 14 at a centroid of the dipole arms 12. The crossing of the connecting arms 32 occurs at different layers of the substrate, as indicated in view of FIGS. 4 and 5 and as will be shown in further detail in view of FIGS. 7 and 8 below.

Furthermore, the connecting holes 18 that are indicated with P11, P12, P21 and P22 are the connecting holes 18 for receiving the contacting protrusions 27 with the respective ground line 26. As indicated by the solid blocks, the electrical connection between the connecting holes 18 and the respective dipole arms 12 occurs by means of a galvanic connection.

In the present example, the electric field vectors of the vector dipoles cross each other at a region of the crossing 34 and extend perpendicular to each other and in a first polarization direction 36 and a second polarization direction 38, so as to define a −45° polarization and 45° polarization relative to the feed plane of the radiator feed 20. The radiator is linear and orthogonal polarized, wherein the feed plane is 45° rotated in respect to the first linear polarization plane and 135° rotated in respect to the second linear polarization plane.

Although the present example indicates two connecting holes 18 for the ground line 26 of each feed line that are arranged adjacent to and at opposing sides of the connecting hole 18 for the signal line of the corresponding feed line, it May alternatively be provided that only one connecting hole 18 for a ground line 26 is present, e.g. the connecting holes 18 indicated as P12 and P22 may not be present. Instead a capacitive coupling may be provided at this portion of the substrate between the respective dipole arm 12 and the (second) ground line 26 of the respective feed line.

Figure 7:
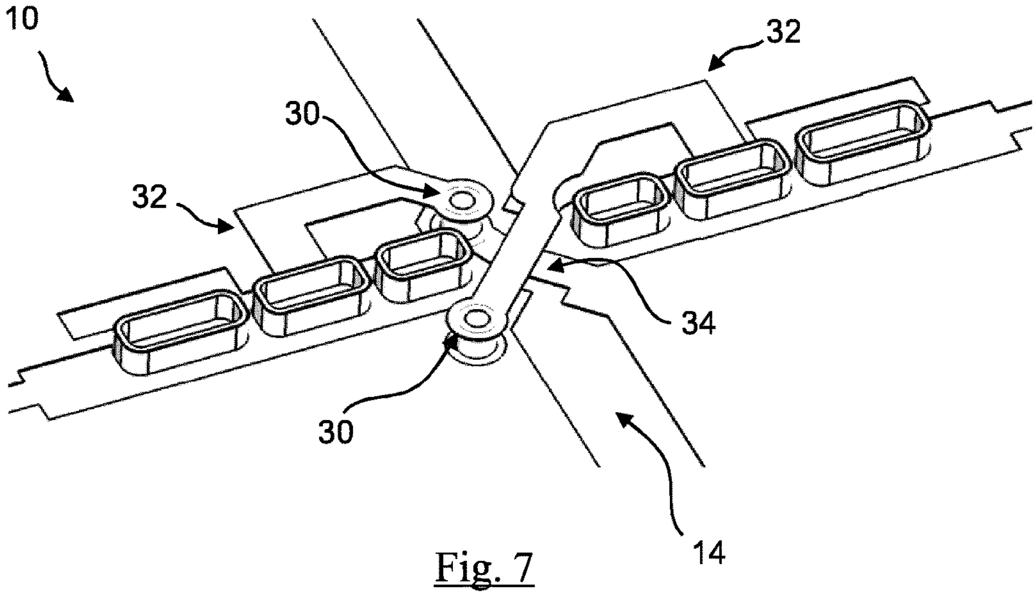
FIGS. 7,8: show a top perspective view of a radiator according to the invention with respective connecting arms for signal lines being arranged at a top surface or bottom surface of the radiator, respectively.
Figure 8:
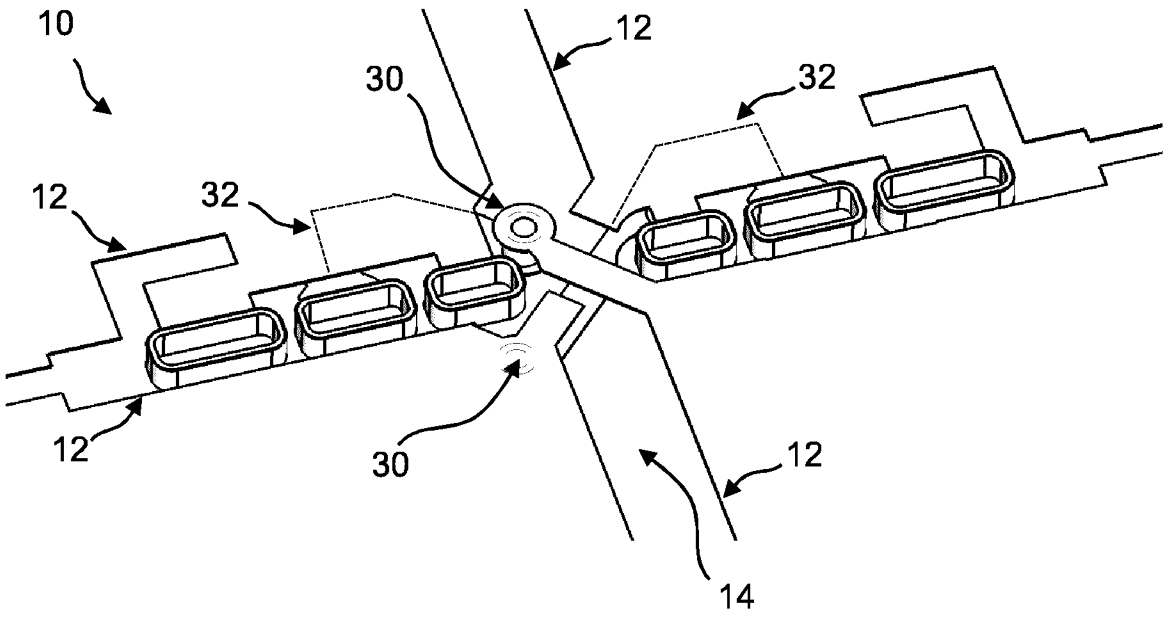

In FIGS. 7 and 8, the connecting arms 32 of the radiator are more clearly depicted (the substrate of the radiator 10 and the radiator feed are hidden for illustrative purposes). In the configuration according to FIG. 7, the metallization of the dipole arms 12 is arranged at the bottom surface and both the connecting arms 32 extend along a top surface of the radiator 10 or substrate thereof. To provide the required electrical connection with the dipole arms, the radiator 10 comprises respective vias 30, which are arranged in such a manner that the connecting arms (and hence the transmitted signals) do not intersect each other.

For example, for one of the connecting arms 32 a via 30 is provided before bridging the region of crossing 34 and for the other connecting arm 32 the respective via 30 is provided after the region of crossing 34 has been bridged. Thus, in the region of crossing 34, the connecting arms extend on different surfaces of the substrate 28.

In the configuration according to FIG. 8 the metallization is present on the top surface of the radiator 10 and the connecting arms 32 essentially extend along the bottom surface of the radiator 10, wherein the vias 30 again ensure the electrical connection to the respective dipole arms 12 or metallization forming said dipole arms 12. The hidden parts of the connecting arms 32 are shown with dashed lines in FIG. 8.

Figure 9:
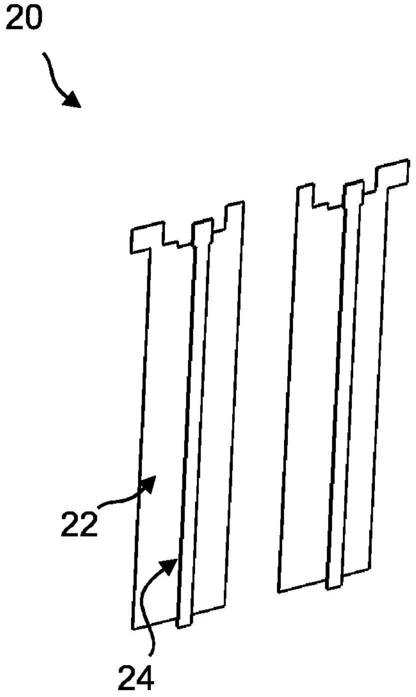
FIGS. 9, 10: show alternative configurations of the radiator feed according to the invention.
Figure 10:
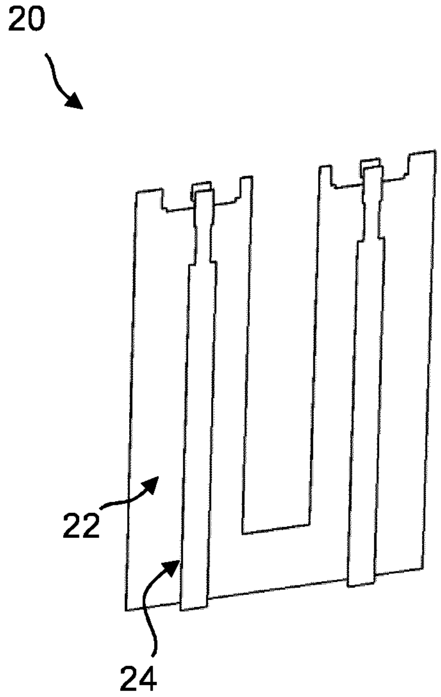

FIGS. 9 and 10 depict alternative configurations of the radiator feed 20, wherein the substrate 22 is not shown for illustrative purposes. Accordingly, the radiator feed 20 may be formed as two parts that may be arranged in parallel within the single feed plane (FIG. 9) or may also be formed as a single part, similar to FIGS. 2 and 3, yet with a recessed connecting portion between the respective feed lines (FIG. 10).

Accordingly, it will be understood that a variety of structures of the radiator feed 20 may be provided, e.g. having a cantilevered or bridged configuration, as long as the radiator feed 20 as a whole is arranged in a single feed plane.

Figure 11:
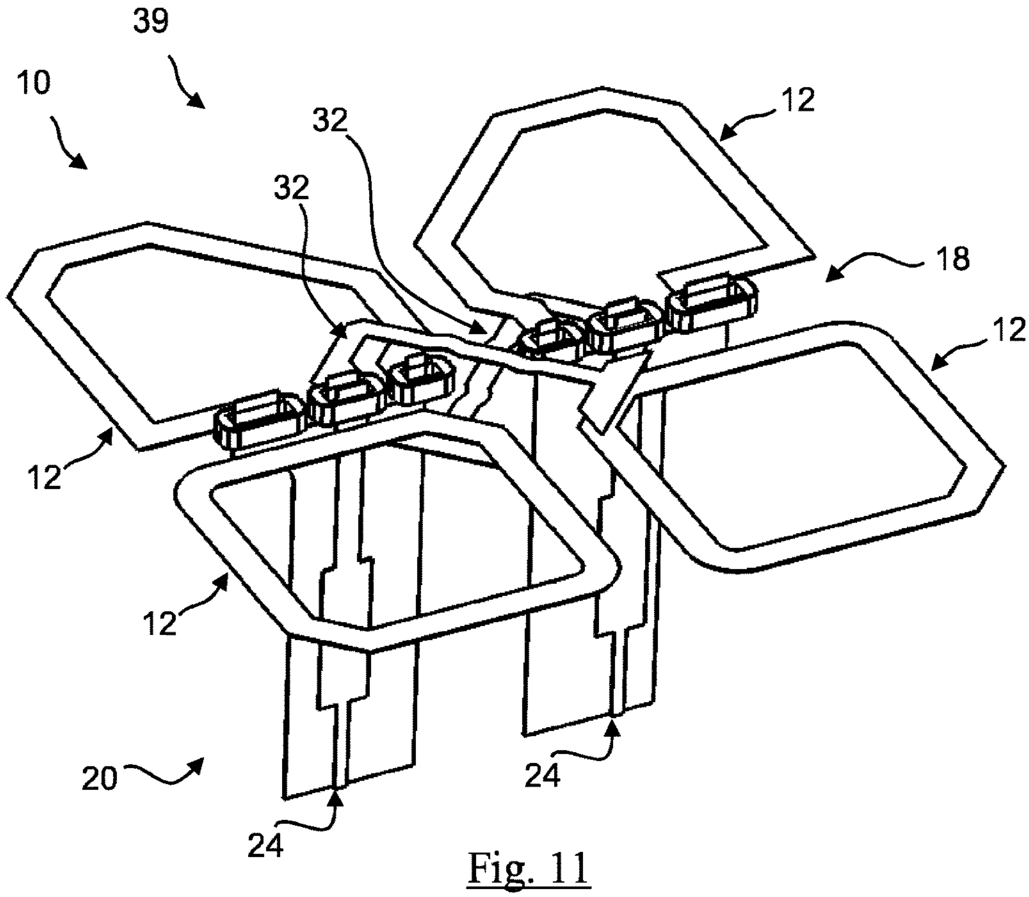
FIGS. 11, 12: show a perspective view and a top view, respectively, of an embodiment of an antenna according to the invention.
Figure 12:
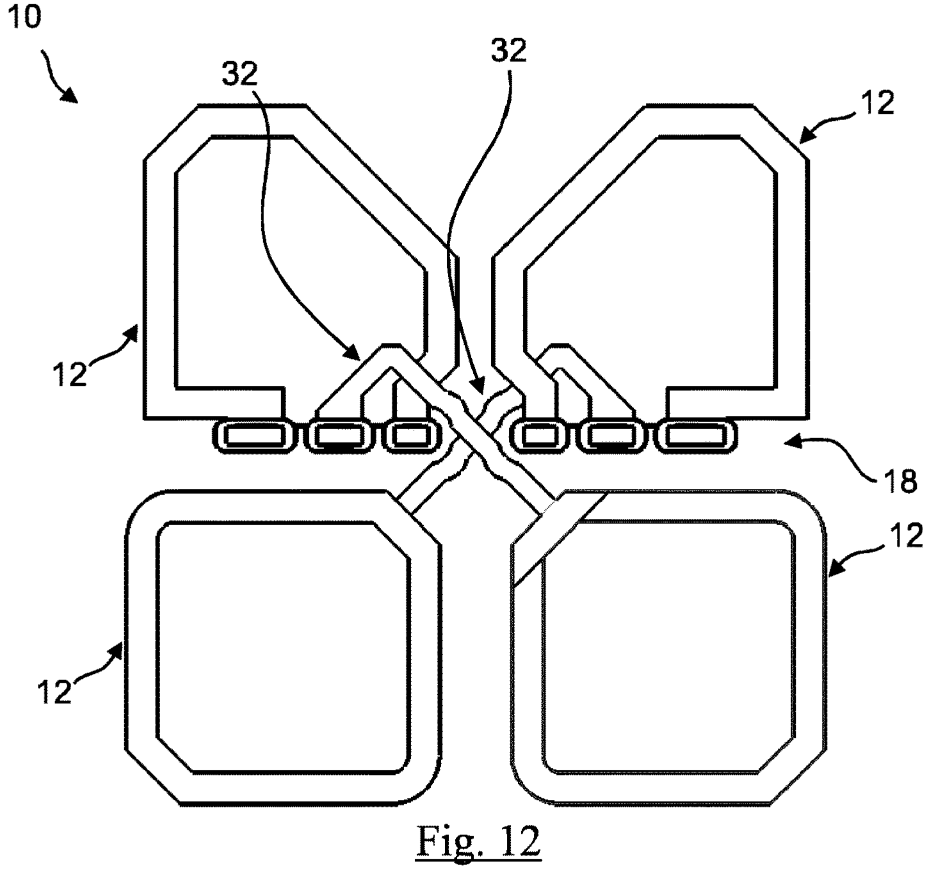

In FIGS. 11 and 12 a preferred embodiment of an antenna 39 having the radiator 10 and the radiator feed 20 is shown. The shown antenna 39 may be particularly advantageous for higher frequency transmissions, e.g. in the range between 3.3 GHz and 4.2 GHz. For illustrative purposes, the substrates 22, 28 are not shown.

The dipole arms 12 of the radiator 10 define a line of symmetry through the centroid of the dipole arms 12. The radiator feed 20 is arranged perpendicular to said line of symmetry and in a gap defined by the dipole arms along a single feed plane.

Here, the dipole arms 12 that are electrically connected to the ground line (top left and top right) are connected to each of the corresponding connecting holes 18, as best shown in FIG. 12. These connecting holes 18, however, are not connected to each other, i.e. the corresponding ground pins are not connected to each other via a corresponding connection line of the radiator 10.

Furthermore, the signal lines 24 of the respective feed lines are electrically connected to a respective dipole arm 12 by means of a respective connecting arm 32. However, in this example, the connecting arms 32 are not galvanically connected to the dipole arms 12, but are instead capacitively coupled to said dipole arms through the substrate (not shown), thereby reducing the need of vias 30.

Figure 13:
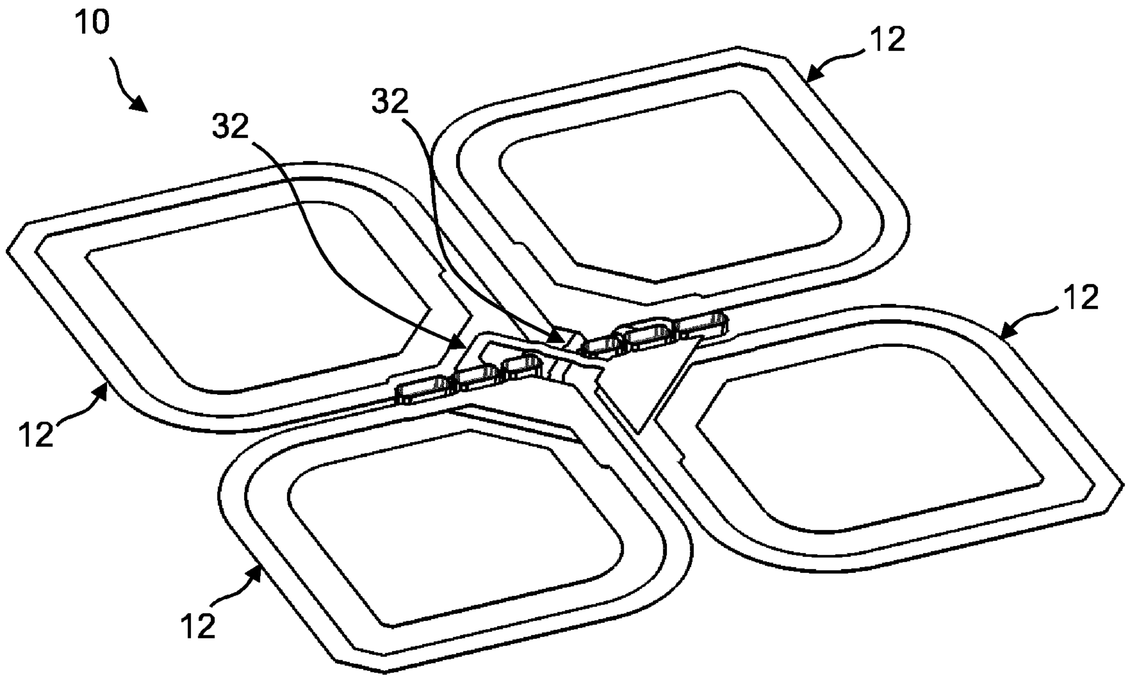
FIGS. 13, 14: show a perspective view and a top view, respectively, of a radiator with a radiator feed according to the invention according to another embodiment.
Figure 14:
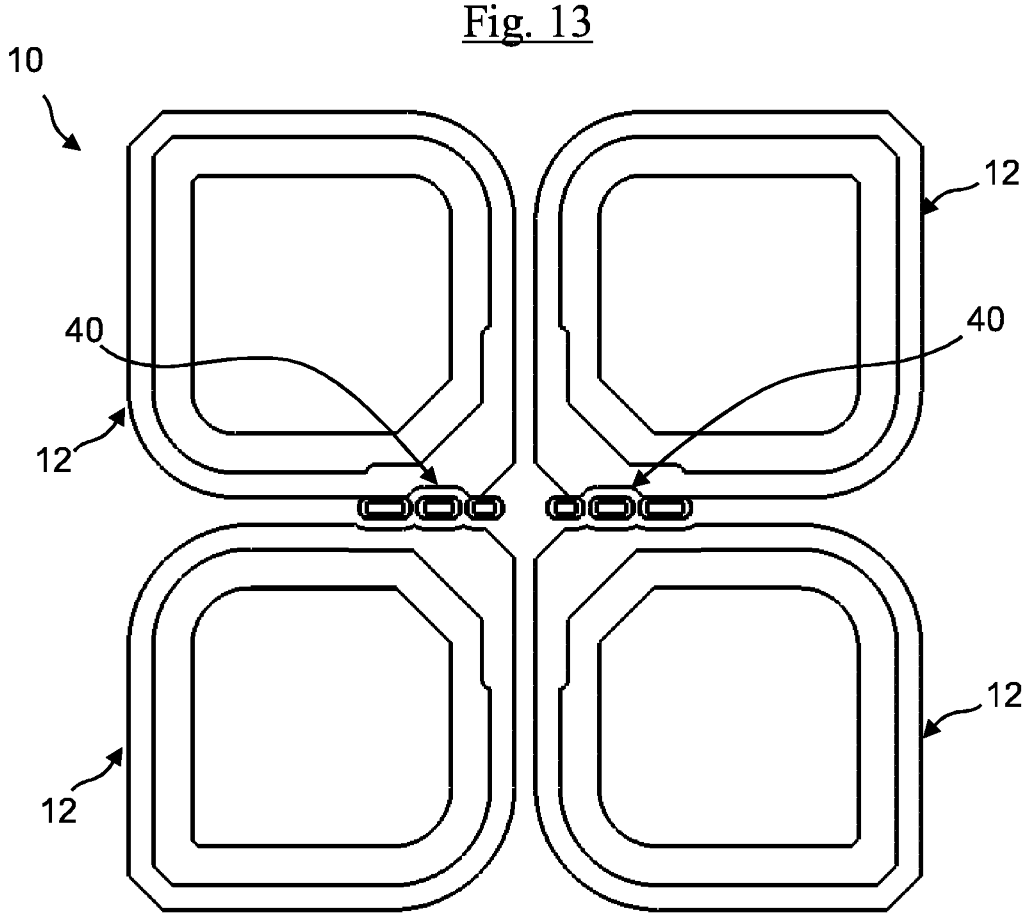

Such capacitive coupling between the connecting arms 32 and the respective dipole arms 12 is also shown in the embodiment according to FIGS. 13 and 14.

In this embodiment, the dipole arms 12 are rotationally symmetrical and may e.g. be used for a transmission frequency in the range of 1.7 GHZ to 2.7 GHZ. Furthermore, according to this example, the radiator 10 comprises an optional connection in the form of a transmission line 40 between two ground pins, which connects the connecting holes 18 of a respective feed line intended to receive the connecting ends of the ground line 26. Such a metallization area between the two pins has been found to improve the performance of the radiator 10, in particular in a lower frequency range, e.g. in the range of 1.7 GHZ to 2.7 GHz.

Figure 15:
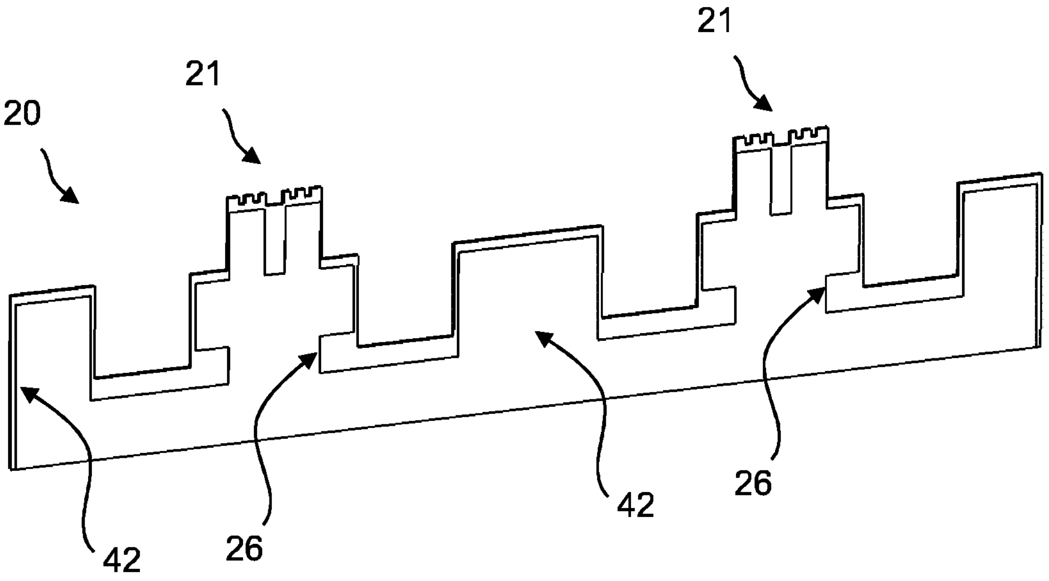
FIG. 15: show a perspective side view of a radiator feed for two radiators.
Figure 16:
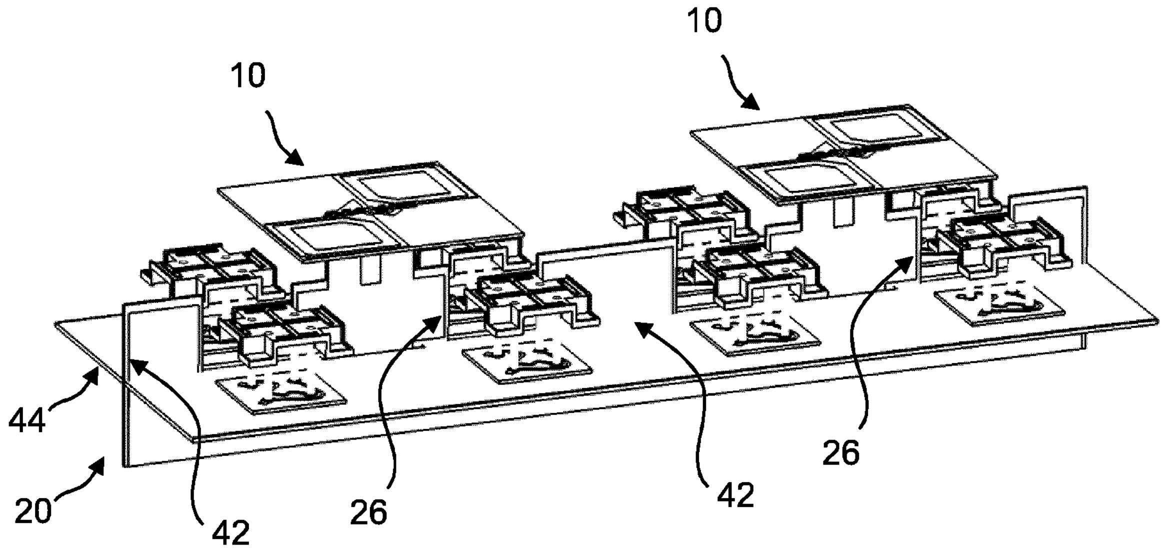
FIG. 16: shows an antenna according to another embodiment of the invention with a radiator feed according to FIG. 15 in a mounted state with a reflector.

According to FIGS. 15 and 16, an embodiment of the radiator feed 20 is shown having two radiator feed pairs 21, i.e. two groups of paired feed lines so as to provide a feed for two adjacent radiators 10, e.g. two radiators 10 for the same frequency range that form an array.

The radiator feed 20 is formed as a single piece and, according to the present example, includes an optional signal distribution network portion, which extends essentially between the radiator feed pairs 21, i.e. between the adjacent radiators 10 in the assembled state.

The radiator feed 20 furthermore comprises a reflector connection 42, so as to form a ground connection for a reflector 44 (FIG. 16) of the antenna 39 in the assembled state. Said reflector connection 42 is arranged at a portion of the radiator feed 20 being spaced apart from the feed lines, i.e. the radiator feed pairs 21. In this manner, interferences arising from the reflector connection 42 are avoided.

For example, the reflector connection 42 is arranged between the radiator feed pairs 21 and/or at an end portion of the radiator feed 20. With the connection, the common mode, also called monopole mode, of at least one radiator may be shifted in frequency.

In FIG. 16 an antenna 39 with the radiator feed 20 according to FIG. 15 is depicted in an assembled state with two radiators 10 as explained above, a plurality of radiators 46 for another frequency range and the common reflector 44.

Here, it is also evident that the single feed plane of the radiator feed 20 considerably reduces the footprint, which provides improved architecture flexibility of the reflector 44 and antenna as a whole and may furthermore improve the functioning of the reflector 44 by reducing detrimental coverage of the reflector 44 by the radiator feed 20.

Further, it can be seen that the reflector connection 42 lies between the radiators 10.

Furthermore, due to the configuration and extension of the radiator feed 20, a signal distribution network portion may extend essentially below or along a bottom surface of the reflector 44, which is further advantageous, both in terms of functioning of the reflector 44 and for heat dissipation purposes.

For further heat dissipation and loss optimization, the radiator feed 20 may also include a transition from microstripline to air-stripline or a transition from microstripline to air-cavity.

Furthermore, the radiator feed 20 can also comprise transmission line crossings and/or at least one exchange of one signal line and one ground line between radiators 10, if it is advantageous for the distribution network, e.g. for the radiator combining or phase shifter concept.

Figure 17:
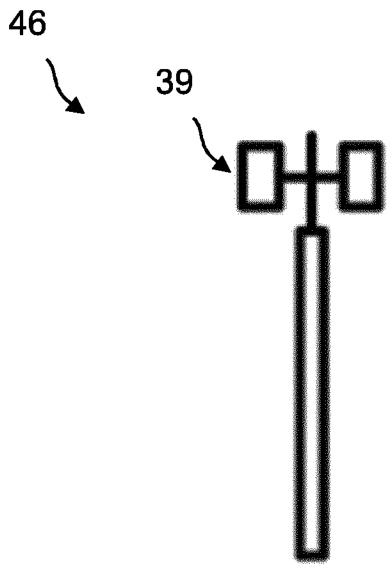
FIG. 17: shows a mobile communication cell site according to the invention with an antenna according to the invention.

FIG. 17 shows schematically a cell site 46 comprising an antenna 39 as explained above.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. An antenna, in particular for a mobile communication cell site, comprising at least one radiator and a radiator feed being electrically coupled to the at least one radiator, the at least one radiator being a dual polarized dipole radiator, wherein dipoles of the dual polarized dipole radiator are formed of two dipole arms and the dipoles are in a crossed arrangement relative to each other, wherein the radiator feed comprises a respective feed line for each dipole of the dipoles and extends within a single feed plane between the dipole arms intersecting the dipoles in a region of the crossing.

2. The antenna according to claim 1, wherein adjacent dipole arms are spaced apart by a gap, wherein the gap defines a feed plane.

3. The antenna according to claim 1, wherein the dipole arms of the dipoles extend in a dipole plane, in particular the dipole arms of both dipoles extend in the same dipole plane, wherein the radiator feed extends perpendicular to said dipole plane.

4. The antenna according to claim 1, wherein the feed plane is 45° rotated in respect to a first linear polarization plane and 135° rotated in respect to a second linear polarization plane.

5. The antenna according to claim 1, wherein the at least one radiator or the radiator feed comprise a substrate and conductors applied to the substrate, wherein the conductors form the dipole arms or the feed lines, respectively, particularly wherein the substrate is a single layered PCB or a multi-layered PCB.

6. The antenna according to claim 5, wherein the substrate of the radiator feed forms a support structure for the at least one radiator or wherein the radiator feed is formed as a single piece.

7. The antenna according to claim 1, wherein each feed line comprises at least one ground line and a signal line, the ground line and the signal line preferably forming a microstrip line.

8. The antenna according to claim 7, wherein each feed line comprises two ground lines that are arranged adjacent to and at opposing sides of the signal line.

9. The antenna according to claim 8, wherein one of the ground lines of a respective feed line is galvanically connected to a respective dipole arm and the other one of the ground lines of the respective feed line is capacitively coupled to the respective dipole arm.

10. The antenna according to claim 8, wherein both ground lines of a respective feed line are galvanically connected to a respective dipole arm, in particular said ground lines are electrically connected to each other via a transmission line arranged on the at least one radiator.

11. The antenna according to claim 7, wherein one of the dipole arms of one of the polarized dipoles of the at least one radiator is electrically connected to the signal line of the respective feed line, in particular wherein the signal line and the at least one ground line are connected to different dipole arms of the two dipole arms.

12. The antenna according to claim 7, wherein the at least one radiator comprises an electrically conducting connecting arm electrically connected to a dipole arm of the two dipole arms and bridging the region of the crossing, in particular wherein the connecting arm is electrically connected to the signal line.

13. The antenna according to claim 12, wherein at least one dipole and the connecting arm of the at least one dipole are arranged at opposing surfaces of the substrate.

14. The antenna according to claim 12, wherein the connecting arm is galvanically connected to the signal line and capacitively coupled to a metallization of the respective dipole arm.

15. The antenna according to claim 7, wherein the radiator feed extends through the substrate of the at least one radiator from a bottom surface of the substrate to a top surface of the substrate, and

- wherein connecting arms of the at least one radiator are arranged along the top surface of the substrate, the bottom surface of the substrate or along opposing surfaces of the substrate and/or
- wherein each dipole arm is formed as a metallization on the substrate, wherein the metallization of each polarized dipole extends in a single plane and wherein the metallization of the polarized dipoles of the at least one radiator are arranged along the top surface of the substrate, the bottom surface of the substrate or along opposing surfaces of the substrate.

16. The antenna according to claim 1, wherein an electric field of the feed lines are in the same plane.

17. The antenna according to claim 1, comprising at least two radiators supported by the radiator feed, wherein the radiator feed is formed as a single piece, in particular wherein the radiator feed includes a signal distribution network portion.

18. The antenna according to claim 17, wherein the radiator feed comprises one or more sidewall portions, preferably extending at least partially in parallel to the feed lines.

19. The antenna according to claim 17, wherein the antenna comprises a reflector, in particular wherein the radiator feed is formed and arranged such that the signal distribution network portion extends essentially above or below the reflector.

20. The antenna according to claim 19, wherein the radiator feed comprises at least one reflector connection to the reflector, particularly the reflector connection being arranged at a portion of the radiator feed being spaced apart from the feed lines, in particular between adjacent radiators.

21. A cell site comprising an antenna, the antenna comprising at least one radiator and a radiator feed being electrically coupled to the at least one radiator, the at least one radiator being a dual polarized dipole radiator, wherein dipoles of the dual polarized radiator are formed of two dipole arms and the dipoles are in a crossed arrangement relative to each other, wherein the radiator feed comprises a respective feed line for each dipole of the dipoles and extends within a single feed plane between the dipole arms intersecting the dipoles in region of the crossing.

* * * * *